Patented Oct. 12, 1948

2,451,018

UNITED STATES PATENT OFFICE 2,451,018

METHOD OF PREPARING AN ISOMERIZATION CATALYST FOR NORMAL PARAFFINS

Robert E. Burk, Cleveland Heights, Ohio, assignor to The Standard Oil Company, Cleveland, Ohio, a corporation of Ohio No Drawing. Application October 28, 1943, Serial No. 508,070

3 Claims. (Cl. 260—683.5)

This invention relates to a new catalyst for effecting reactions involving aliphatic hydrocarbons, and to processes of treating hydrocarbons in which the catalyst is used.

I have proposed previously to carry out reactions of aliphatic hydrocarbons using a catalyst in which the primary ingredients are hydrogen fluoride promoted by boron trifluoride, and desirable results have been obtained using this catalyst in a wide variety of processes.

I have discovered that when a number of these processes involving aliphatic hydrocarbons are carried out using hydrogen fluoride and boron trifluoride in the presence of an olefin, a new catalyst is formed in which the olefin is an influence or a component, and that superior results are obtained in many reactions with this new catalyst. The olefin possibly may be regarded as functioning in the manner of a promoter.

It is an object of this invention to provide a new catalyst suitable for effecting reactions involving aliphatic hydrocarbons.

It is a further object of the invention to react aliphatic hydrocarbons in processes such as isomerizing, "averaging," cracking, and similar processes of converting aliphatic hydrocarbons into others of lower or higher molecular weight or of different molecular structure, using the new catalyst to effect these reactions.

Another object of the invention is the provision of a catalyst which may be readily modified in activity so that the reaction may be readily controlled by means of variations in the catalyst.

Another object of the invention is the provision of a catalyst from which the fluoride constituents are readily separated from the olefinic constituent, and are available for the formation of an additional quantity of the catalyst from a fresh amount of olefins or for other purposes.

Another object of the invention is to provide a catalyst, which although containing an olefinic hydrocarbon as an ingredient, is nevertheless immiscible with the aliphatic hydrocarbons being treated in accordance with the process, so that the catalyst phase and the treated hydrocarbon can be readily separated after the treating operation.

The catalyst of the invention comprises hydrogen fluoride, boron trifluoride, and an olefin; it exists in the liquid phase. Hydrogen fluoride boils at about 67° F. and is therefore a liquid at temperatures below about room temperature. It may be kept in the liquid phase at higher temperatures by moderate pressures. The temperatures and pressures used in the above-mentioned hydrocarbon treating processes are conveniently those that maintain the hydrogen fluoride liquid. Boron trifluoride boils at —150° F. and is a gas at the temperatures and pressures usually employed in these hydrocarbon treating processes. However, boron trifluoride dissolves in liquid hydrogen fluoride to a given extent and the amount which dissolves at any given temperature depends on the partial pressure of boron trifluoride. At higher partial pressures, larger amounts of boron trifluoride are dissolved.

The boron trifluoride dissolved in the hydrogen fluoride in the liquid phase possibly may react at least to some extent. While an understanding of the chemistry involved is not necessary for the practice of my invention, the following theory and reactions may be of assistance in understanding the results obtained. Such a reaction, if it occurs, may be viewed as follows:

$$HF + BF_3 \rightleftharpoons HBF_4 \qquad (1)$$

Thus the amount of $HBF_4$ formed, if the reaction suggested is correct, is a function of the partial pressure of the boron trifluoride. The amount of boron trifluoride dissolved in the hydrogen fluoride, at any given temperature, may be expressed conveniently in terms of the partial pressure of boron trifluoride. This may vary, in accordance with the invention, from a trace to 1000 pounds per square inch, when preparing the new catalyst. Generally, about 25 to 300 pounds per square inch will be used. However, the amount should under no circumstances exceed 50 mol per cent of the fluorides. With partial pressures usually used the amount does not exceed 15 mol per cent. Thus the solution of boron trifluoride dissolved in hydrogen fluoride may possibly be viewed as a mixture of HF and $HBF_4$. The words "dissolved" and "solution" are used as generic to both a physical mixture and a reaction mixture.

Evidence available indicates that when such a solution of boron trifluoride-hydrogen fluoride is contacted with an olefin a reaction of some type takes place to form a new compound or at least a loose chemical complex. Without wishing to be limited to any theory or explanation, the phenomena may possibly be explained by the following reaction:

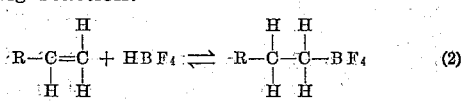

where R is the olefin residue or hydrogen. The entire reaction therefore may be viewed as follows:

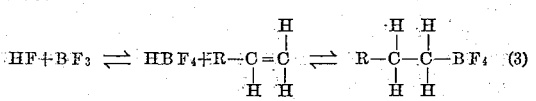

The amount of the olefin may vary from extremely small amounts to 100 or more mol per cent based on the amount of boron trifluoride dissolved in the hydrogen fluoride. If the mol ratio is less than 100%, the catalyst may be viewed as a mixture of hydrogen fluoride and boron trifluoride (or HF and HBF4) plus the new catalyst. The amount of the catalyst used in a hydrocarbon treating process may be varied somewhat, and the variation may be accomplished by controlling the amount of olefin. Amounts of olefin in excess of equal mol proportions with the dissolved boron trifluoride are not disadvantageous except that this may result in a polymerization which yields polymers of olefin in the new catalyst; these may not be as active as the lower olefinic compounds of the fluorides. The amount of the olefin is not viewed as critical and any amount of significance reflects an improvement in the process. In a commercial embodiment, however, the amount to be used is that which results in optimum yields. Expressed in practical terms the amount of olefin may be ½ to 25 weight per cent based on the hydrocarbon being treated.

The amount of composition of the catalyst and therefore the activity may also be controlled by varying the partial pressure of the boron trifluoride. This is one of the most important aspects and advantages of the invention. When the partial pressure of boron trifluoride is changed, this results in a change in the amount of the boron trifluoride dissolved in the hydrogen fluoride and therefore the amount which is available to react in accordance with Equation 2. If this is the correct explanation, the control of the boron trifluoride partial pressure is a control of the amount of the olefinic-fluoride complex which comprises the new catalyst. For example, if the olefin is present in an ample amount and the partial pressure of boron trifluoride is increased, this will result in a shift of the reaction to the right in Equation 3. On the other hand, if during the reaction the partial pressure of boron trifluoride is lowered, this will result in a shift of the reaction to the left.

The ingredients of the catalyst may be brought together in any order or simultaneously. Generally, it is convenient to feed the fluorides together or separately to the olefin which may be in admixture with the hydrocarbon to be treated. Alternatively, the olefin may dissolve in one or more of the fluorides before they are contacted with the hydrocarbon. The catalyst so formed is used in treating the hydrocarbon and after the treating process the catalyst may be separated and re-used for treating a separate amount of the hydrocarbon; this may or may not contain an olefin to form an additional amount of catalyst.

In the application of the catalyst to hydrocarbon treating processes, the olefin may have the same number of carbon atoms as the hydrocarbon to be treated or not. It may be ethylene, propylene, butylenes, amylenes, or other higher olefins; diolefins may also be used if the conditions are controlled to prevent undue polymerization. For example, if n-butane is to be isomerized the olefin may be butene, and if the butene is initially contained in a mixture with the butane it need not be separated, at least for the initial fraction to be isomerized. The olefin need not be in the pure state and may be in the form of cracking coil stocks or other stocks that are highly olefinic in character.

In "averaging," a low molecular weight hydrocarbon such as butane or pentane and a higher molecular weight hydrocarbon, such as those in kerosene, naphtha or gas oil, are reacted with the catalyst to form hydrocarbons of molecular weight intermediate of the molecular weights of the two reacting materials. In the "averaging" process the olefin may be contained in either of the hydrocarbon fractions or may be introduced separately or absorbed in the fluorides in a controlled amount. It may be of any molecular weight but preferably the number of carbon atoms is not greater than the number of carbon atoms in the higher molecular weight fraction to be averaged.

In cracking processes using the new catalyst, naphtha, kerosene, gas oil or other stock to be cracked is treated with the catalyst. The catalyst may be formed in situ by the presence of olefins in the charge stock, added in controlled amount.

The hydrogen fluoride and boron trifluoride used may be the commercially available grades. It is not necessary to have chemically pure fluorides. The impurities in the commercial grades including water, which are generally present in an amount of not over about one per cent, do not interfere with the operation of the catalyst. In view of the economic advantage of using the commercial grade, it is preferred, and was used in the following examples.

The conditions under which the catalyst is used will vary somewhat with the hydrocarbon treating process to which it is applied. It will also depend upon the starting materials and the products wanted. The temperature in general may vary from −30° to 250° F. Generally a range from 0° F. through room temperature to 185° F. is preferred. It is an advantage of the new catalyst that extreme temperatures in either direction are not needed.

The total pressure may vary from atmospheric to 1000 pounds per square inch and it must, of course, be equal to or exceed the partial pressure of boron trifluoride. Generally, at least a small total pressure is necessary which is attributed primarily to the partial pressure of boron trifluoride. The total or gauge pressure is always sufficient to keep the catalyst liquid at the temperature employed. It is also preferred that the pressure be sufficient to keep the hydrocarbons liquid at the temperature employed although this is not essential if thorough mixing of the catalyst and hydrocarbons is secured. At the temperature ranges usually used, it is an advantage that high pressures are not required.

The amount of the liquid catalyst phase used in the process may vary depending upon the reaction and the other conditions and may be from 5–300 volume per cent based on the liquid hydrocarbons to be treated. By liquid catalyst phase I mean the hydrogen fluoride containing the new catalyst, and/or boron trifluoride since generally there may be hydrogen fluoride in excess of that required for a combination in accordance with Equation 2. It may be that the new catalyst should be regarded as a promoter, but I do not intend that matters of terminology shall alter the concept here described.

The time of contact between the hydrocarbon and the catalyst may vary with the temperature, thoroughness of contact with the catalyst and other factors, and depending upon such factors, the time may be selected to give optimum yields. This will be from a few minutes to several hours. In the examples given later one-half hour is used. However with more thorough mixing this time probably can be reduced materially. Commercial considerations indicate the time necessary should be the minimum to permit the reaction to go to the desired extent under the other operating conditions.

In general, milder conditions may be used for isomerizing since desirable equilibrium conditions are in general obtained at lower temperatures. Cracking requires somewhat more drastic conditions, and higher temperature and larger amounts of catalyst may be used. "Averaging" requires a powerful catalyst but the temperature must be held down. The various factors are interdependent. For example, if a lower temperature is used a somewhat larger amount of catalyst may be present to obtain the same result as would be obtained with a higher temperature and a lesser amount of catalyst. While the range of temperature, time of contact, etc. may be the same for all processes, this does not mean that the same conditions can be used to effect different processes. For example, at a given high temperature, mild conditions may be obtained by low partial pressure of boron trifluoride, suitable for isomerizing. Thus for almost any temperature a given mild condition can be obtained by adjusting the other variables, particularly the boron trifluoride partial pressure. It is an important discovery that in addition to varying temperature, time of contact, pressure, which are variables the prior art has had available, my invention provides a new variable which can be readily controlled. Thus, it is possible to go from mild through intermediate to drastic conditions merely by increasing the partial pressure of boron trifluoride and in some cases also the amount of olefin; and consequently an increase in the amount of the catalyst. This may be of great importance when using equipment that does not lend itself to changes in temperature, rate of flow, etc.

The processes of using the new catalyst are adapted either for batch operation or for continuous operation. In the case of batch operation the hydrocarbons to be treated, the fluorides and the olefin are brought together in order into a suitable container or autoclave, where they are preferably subjected to agitation, and are maintained under temperature and pressure conditions for the desired length of time. Following the treatment the materials will stratify when permitted to come to a quiescent state or, if desired, forces greater than gravity, such as centrifuging, may be used to effect the separation. The lighter or upper layer will contain the hydrocarbons which have been altered in accordance with the process under consideration and the lower layer will comprise the catalyst phase. If the pressure is released or lowered more or less of the new catalyst will be decomposed, and a large proportion of the boron trifluoride will be released as a gas. If the temperature is higher than 67° F. hydrogen fluoride also will be released. However, the separation can be made under pressure and the catalyst and the lower or heavier layer may be re-used for further treatment of a further quantity of the hydrocarbon.

In a continuous process the fluorides, olefin, and hydrocarbon or hydrocarbons to be treated are fed into a continuous type mixer, for example, a 3-stage mixer maintained at the desired temperature and under the appropriate pressure. The rate of flow through the mixer is adjusted so that the hydrocarbons are in contact with the catalyst for the desired length of time. The mixture may be fed into a separator where it is permitted to stratify. The upper layer containing the hydrocarbons formed in the process may be continuously withdrawn and the lower layer comprising the catalyst phase may be recirculated to the mixing zone. If the olefin is introduced by way of a separate supply it need be added only at the start of the process and the fluorides-olefin catalyst may be circulated and re-used with fresh supplies of the hydrocarbons to be treated. On the other hand, if the olefin is admitted with the hydrocarbon to be treated so that the amount of catalyst gradually builds up or if the catalyst becomes deactivated through polymerization or continued use, it may be desirable to withdraw a portion or all of the catalyst phase and subject it to a relatively high temperature, for example 250–600° F. At this temperature the catalyst decomposes and substantially all of the fluorides are liberated therefrom as gases. These can be collected and condensed and/or compressed and returned to the mixing zone or stored or otherwise used.

Alternatively, instead of distilling the fluorides, the lower layer or catalyst phase may be treated with a material which exerts a solvent action on the fluorides and which is immiscible with the hydrocarbons in the lower layer, or which forms a chemical compound or complex with the fluorides, and from which the fluorides may be released later, for example, by heating. Such a material may be dihydroxy fluoboric acid. Another alternative is to distill off a part or most of the fluorides from the lower layer and remove the rest by extraction with such a material. The hydrocarbons in the upper layer also can be treated with such a material to extract fluorides therefrom.

In either of the above processes and especially the continuous process, it will be seen that for a given temperature, pressure and time of contact, the rate of the reaction can be adjusted by varying the amount of catalyst. This in effect can be varied by adjusting the partial pressure of the boron trifluoride since, as explained above, the amount of the fluoride-olefin catalyst may be viewed as a function of the partial pressure of the boron trifluoride. To lower the pressure it is necessary only to open a valve in the mixer and boron trifluoride will be released and can be sent to storage. To increase the pressure, boron trifluoride from a high pressure storage supply can be admitted to the mixing stage.

The new catalyst, as has been stated heretofore, is particularly useful for effecting reactions with aliphatic hydrocarbons, such as paraffins and cycloparaffins. The catalyst is poisoned in the presence of certain aromatics. To understand the phenomena, it seems possible that the catalyst and an aromatic react, possibly in accordance with the following equation:

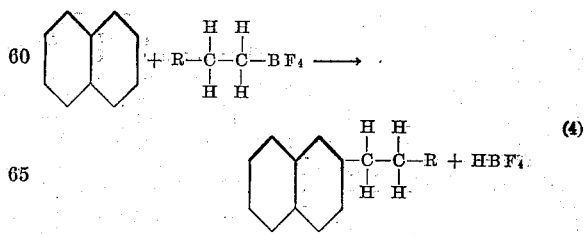

This equilibrium is far to the right. Therefore the catalyst is used up in the presence of an aromatic or may not be formed so as to exist in an effective amount.

In view of the above considerations it is advisable that the stock to be treated with the catalyst be relatively free from aromatics or be dearomatized. The latter may be accomplished by solvent extraction in accordance with processes well known in the art, or with liquid hydrogen fluoride containing dissolved boron trifluoride in accordance with my application, Serial Number 423,303, filed December 17, 1941, now Patent No. 2,343,744. The dearomatized stock may then be treated with my new catalyst comprised of hydrogen fluoride, boron trifluoride and an olefin.

If the stock contains both aromatics and olefins, it may be treated with liquid hydrogen fluoride containing dissolved boron trifluoride and aromatics and olefins will both be eliminated probably through alkylation of aromatics as described in Equation 4 and the formation of a complex with the alkylated aromatics which separates in the lower layer. If the olefins are present in an excess, the upper layer may then be treated to form the new catalyst, or if not a controlled amount of olefin may be introduced to form the new catalyst.

From the above explanation it will be seen that instances where the olefin for the formation of the new catalyst is to be obtained from an olefinic content in the stock to be treated, the stock should be relatively free from aromatics.

As illustrative of the application of my new catalyst to isomerizing, the following example of isomerizing natural gasoline is given.

The process was carried out in a pressure reactor. The hydrogen fluoride was first charged, followed by the natural gasoline and butylene. Boron trifluoride was then admitted under pressure. The reaction continued for one-half hour after which the mixture was stratified and the upper hydrocarbon layer withdrawn under pressure. A fresh gasoline charge was then introduced under pressure and treated with the catalyst remaining in the reactor. This was repeated, and the ninth to twelfth batches were pooled for analysis, as these were regarded as indicative of what might be expected from a truly continuous process.

Further data are as follows:

| Charge Stock | Natural Gasoline |
| --- | --- |
| HF (volume based on hydrocarbon)_____percent\_\_ | 78 |
| BF$_3$ (partial pressure)_____p.s.i\_\_ | 25 |
| Olefin (butylene) (on hydrocarbon)_____percent\_\_ | 2.5 |
| Temperature_____°F\_\_ | 90 |
| Total Pressure_____p.s.i\_\_ | 55 |
| Time of Reaction_____hours\_\_ | ½ |

The same procedure was repeated except that no olefin was used in order to determine the effect of the new catalyst as compared with hydrogen fluoride and boron trifluoride alone.

The results are as follows:

| | Charge | With Olefin | Without Olefin |
| --- | --- | --- | --- |
| Less than Butane | 0.0 | 0.0 | 0.0 |
| Isobutane | 0.0 | 5.9 | 0.0 |
| N-butane | 11.1 | 11.4 | 12.4 |
| Isopentane | 19.6 | 22.3 | 21.2 |
| N-pentane | 23.6 | 15.6 | 21.7 |
| Hexane and heavier | 43.2 | 44.8 | 44.8 |
| Total Butane | 11.1 | 17.3 | 12.4 |
| Percent Iso in Butane | 0.0 | 34.1 | 0.0 |
| Total Pentane | 43.2 | 37.9 | 42.8 |
| Percent Iso in Pentane | 45.4 | 58.8 | 49.4 |
| Blended ASTM Octane Number of Hexane to 300° F. fraction +4 cc. TEL/gal | 78.5 | 90.5 | 87.5 |

From the above analysis it will be seen that in accordance with the invention the amount of iso-butane is desirably large, the amount of pentane is reduced and the amount of iso-pentane increased. The knock rating of the heavier fraction is noticeably improved.

As illustrative of the application of the invention to the isomerization of butane, a procedure was followed similar to that described above and the samples from the ninth and twelfth isomerizations were analyzed. Further data are as follows:

| Charge Stock | Butanes |
| --- | --- |
| HF (volume based on hydrocarbon)_____percent\_\_ | 100 |
| BF$_3$ (partial pressure)_____p.s.i\_\_ | 200 |
| Olefin (butene)_____percent\_\_ | 2.2 |
| Temperature_____°F\_\_ | 122 |
| Total Pressure_____p.s.i\_\_ | 350 |
| Time_____hours\_\_ | ½ |

The results are as follows:

| | Charge | 9th Isomerization | 12th Isomerization |
| --- | --- | --- | --- |
| Less than C$_4$ | | 0.49 | 0.76 |
| Isobutane | 15 | 51.5 | 53.2 |
| Products heavier than Butane | | 6.49 | 9.13 |
| Percent Isobutane based on n-butane charge | 15 | 40.3 | 40.8 |

Similar processes not using an olefin but using lower and higher partial pressures of boron trifluoride results in conversions of only 20.5% or 27.2% respectively to iso-butane based on the butane charged.

In the first example it will be seen that the relatively mild conditions are obtained by the low partial pressure of boron trifluoride. In the second example, where there is nothing higher than butane in the stock and where there need be less concern to avoid cracking, somewhat stronger conditions may be used, i. e. higher temperature and higher partial pressure of boron trifluoride.

As illustrative of the application of the invention to cracking, the following example is given of cracking natural gasoline (containing mostly pentane and hexanes). The procedure followed is that described previously except that only two samples were treated, the second using the catalyst remaining after the first treatment.

Further data and results are as follows:

| | First treatment | Second treatment |
| --- | --- | --- |
| Natural gasoline | 90 | 98 |
| Butylene | 10 | 2 |
| HF (based on charge)_____vol. per cent\_\_ | 25 | (¹) |
| Temperature_____°F\_\_ | 130 | 130 |
| Time_____hours\_\_ | ½ | ½ |
| BF$_3$ partial pressure_____p.s.i\_\_ | 150 | 150 |
| Total pressure_____p.s.i\_\_ | 207 | 207 |

¹ Lower catalyst layer from first treatment.

The products formed are as follows:

| | Charge | First treatment | Second treatment |
| --- | --- | --- | --- |
| Less than Butane | 0.0 | 1.48 | 0.12 |
| Iso-butane | 0.6 | 23.5 | 6.75 |
| N-butane | 10.3 | 7.5 | 10.15 |
| Isopentane | 20.6 | 23.6 | 17.30 |
| Pentane | 22.0 | 1.3 | 24.7 |
| Above pentane | 46.5 | 22.9 | 41.03 |
| Lower layer | | 19.7 | >19.7 |

In the above it will be noted that most of the product formed is iso-butane because such a light stock is selected for cracking.

A comparison of the products formed in this example with the first example from the same stock will show the effect of more drastic conditions in this example, i. e., higher temperature and partial pressure of boron trifluoride change the process from one of isomerization to cracking.

The process may be applied similar to the cracking of heavier stock under about the same conditions.

When the process is applied to "averaging," n-butane and kerosene may be reacted under conditions about intermediate between those given above for isomerizing and cracking. The olefin may be admitted to the mixer through a separate valve or may be in admixture with the butane that is used in the averaging process.

In another application of the catalyst, propane and pentane may be averaged to form butanes in which process there is a net consumption of the propane and the pentane. In such a process the temperature may be about 175 to 190° F., a partial pressure of boron trifluoride of 150 pounds per square inch and a total pressure of 500 to 700 pounds per square inch (because of the low boiling point of the propane). An olefin such as propylene is contained in the propane feed.

My invention is capable of many applications and embodiments as will be apparent to one skilled in the art in view of the disclosure herein, and all are to be included as are within the scope of my claims.

I claim:

1. A method of preparing a catalyst for use in effecting isomerization of normal paraffins under isomerizing conditions, which comprises bringing together liquid hydrogen fluoride, and boron trifluoride under a partial pressure of 5–550 pounds per square inch, in contact with a normal paraffin to be isomerized and ½ to 25 weight percent of an olefin based on the weight of the hydrocarbon to be isomerized, said amount of olefin being merely that which modifies the catalytic activity of the fluorides in effecting the isomerization of the normal paraffin as the primary reaction.

2. A method of preparing a catalyst for use in effecting isomerization of normal butane under isomerizing conditions, which comprises bringing together liquid hydrogen fluoride, and boron trifluoride under a partial pressure of 5–550 pounds per square inch, in contact with the normal butane to be isomerized and ½ to 2½ weight percent of an olefin based on the normal butane to be isomerized, said amount of the olefin being merely that which modifies the catalytic activity of the fluorides in effecting the isomerization of the normal butane as the primary reaction.

3. A method of preparing a catalyst for use in effecting isomerization of normal butane under isomerizing conditions, which comprises bringing together liquid hydrogen fluoride and boron trifluoride under a partial pressure of 5–550 pounds per square inch in contact with the normal butane to be isomerized and 2½ weight percent of butene based on the normal butane to be isomerized, said amount of butene being merely that which modifies the catalytic activity of the fluorides in effecting the isomerization of the normal butane as the primary reaction.

ROBERT E. BURK.

REFERENCES CITED

The following references are of record in the file of this patent:

UNITED STATES PATENTS

| Number | Name | Date |
| --- | --- | --- |
| 1,187,775 | Oswalt et al. | June 20, 1916 |
| 2,217,019 | Ipatieff et al. | Oct. 8, 1940 |
| 2,240,134 | Egloff | Apr. 29, 1941 |
| 2,276,171 | Ewell | Mar. 10, 1942 |
| 2,285,785 | Seguy | June 9, 1942 |
| 2,315,078 | Pines et al. | Mar. 30, 1943 |
| 2,340,934 | Connolly | Feb. 8, 1944 |
| 2,347,274 | McAfee et al. | Apr. 25, 1944 |
| 2,411,992 | Krosse et al. | Dec. 3, 1946 |

FOREIGN PATENTS

| Number | Country | Date |
| --- | --- | --- |
| 313,067 | Great Britain | Acc. June 5, 1929 |

OTHER REFERENCES

Ipatieff Catalytic Reactions at High Pressures and Temperatures, Macmillan, N. Y., 1936, pages 686–692.